United States Patent [19]
Rensel et al.

[11] Patent Number: 5,590,745
[45] Date of Patent: Jan. 7, 1997

[54] VIBRATION DAMPING DEVICE USING ER FLUIDS HAVING MULTIPLE ELECTRODES

[75] Inventors: John D. Rensel, Tallmadge; David A. Weitzenhof, Akron, both of Ohio

[73] Assignee: Bridgestone/Firestone, Inc., Akron, Ohio

[21] Appl. No.: 491,514

[22] Filed: Jun. 19, 1995

[51] Int. Cl.$^6$ .................................................. F16F 15/03
[52] U.S. Cl. ........................................ 188/267; 188/322.5
[58] Field of Search .................................... 188/267, 276, 188/286, 287, 299, 322.19, 322.5

[56] References Cited

U.S. PATENT DOCUMENTS

| | | | |
|---|---|---|---|
| 4,819,772 | 4/1989 | Rubel | 188/299 |
| 4,838,392 | 6/1989 | Miller et al. | 188/299 X |
| 4,858,733 | 8/1989 | Noguchi | 188/267 |
| 4,896,752 | 1/1990 | Shtarkman | 188/299 |
| 5,000,299 | 3/1991 | Goto et al. | 188/267 |
| 5,014,829 | 5/1991 | Hare, Sr. | 188/267 |
| 5,018,606 | 5/1991 | Carlson | 188/267 |
| 5,076,403 | 12/1991 | Mitsui | 188/267 |
| 5,161,653 | 11/1992 | Hare, Sr. | 188/267 |
| 5,170,866 | 12/1992 | Ghaem | 188/267 |
| 5,180,145 | 10/1993 | Watanabe et al. | 267/64.24 |
| 5,259,487 | 11/1993 | Petek | 188/267 |
| 5,263,558 | 11/1993 | Yamaoka | 188/267 |
| 5,316,112 | 5/1994 | Kimura et al. | 188/267 |
| 5,366,048 | 11/1994 | Watanabe et al. | 188/267 |

FOREIGN PATENT DOCUMENTS 0552568  12/1992  European Pat. Off. .

OTHER PUBLICATIONS

Nicholas K. Petek et al., "Demonstration of an Automobile Semi-Active Suspension Using Electrorheological Fluid" Society of Automotive Engineers Paper No. 950586 (1995).

*Primary Examiner*—Josie Ballato
*Attorney, Agent, or Firm*—Carmen S. Santa Maria

[57] ABSTRACT

A vibration damping device for mounting between two spaced portions of a vehicle for absorbing road forces exerted on the vehicle. An inner metal cylindrical housing forms an internal piston chamber and is connected at one end to one portion of the vehicle, with the outer end of the rod of a piston which is slidably mounted within the piston chamber, being connected to the other portion of the vehicle. An outer housing surrounds a portion of the inner housing and forms a fluid transfer duct between fluid chambers formed on opposite sides of the piston within the piston chamber. A plurality of spaced metal electrode bands are mounted on an inner surface of the outer housing and are electrically isolated therefrom and communicate with the fluid transfer duct for applying voltages across the duct to affect the viscosity of an electrorheological (ER) fluid flowing therethrough to increase the damping force of the device. Certain of the electrode bands may be formed with a plurality of circumferentially spaced, longitudinally extending splines and intervening grooves, which grooves align with splines and grooves formed in a dielectric insulating sleeve mounted adjacent the fluid transfer duct.

25 Claims, 4 Drawing Sheets

VIBRATION DAMPING DEVICE USING ER FLUIDS HAVING MULTIPLE ELECTRODES

BACKGROUND OF THE INVENTION

1. Technical Field

The invention relates to vibration damping devices which develop damping performance when being applied to a suspension member, such as for automobiles or other equipment. More particularly, the invention relates to such a damping device using an electrorheological (ER) fluid as the damping medium and having a plurality of spaced electrode bands, which device is of a relatively simple structure, easy to assemble and to apply a voltage to the ER fluid contained therein for changing the damping characteristics of the device.

2. Background Information

Vibration damping devices have been used for considerable periods of time to dampen the vibrational forces applied to the suspension system of vehicles to provide a controlled response by reducing the vibrations caused by road bumps and depressions passing from the tires to the vehicle frame by the interposing of oil-filled shock absorbers or high-pressure gas damping devices.

Although these prior art oil and high-pressure gas damping devices have proven satisfactory, a more recent development has evolved in which an electrorheological or electroviscous fluid is used within the chamber of the damping device, wherein the liquid is in contact with one or more electrodes, usually mounted in a restrictive passage, which depending upon the size of the electrodes and the amount of voltage applied to the liquid, will change the viscosity of the liquid, enabling the damping device to have a greater range of performance characteristics than those achieved by the high-pressure gas or oil-filled shock absorbers.

An example of an anti-vibration device which uses an expandable liquid chamber containing an electrorheological fluid is shown in U.S. Pat. No. 4,973,031. U.S. Pat. No. 4,858,733 discloses another damping device using electrodes in combination with an electroviscous liquid contained within closed chambers. The liquid is movable through a restricted passage where voltage is applied to the electroviscous liquid as it moves through the passage to change its viscosity to achieve various damping effects. Various other types of such ER vibration damping devices use elastomeric members or sleeves for containing the ER fluid, such as shown in U.S. Pat. No. 5,180,145. Although these devices have proved satisfactory, they are limited as to the amount of internal pressures available for damping, since the sleeves expand and affect the response time and peak force available.

Therefore, the use of rigid fluid chambers formed of metal have been utilized with ER fluids in order to be able to develop higher internal pressure and quicker response times. U.S. Pat. Nos. 4,819,772 and 5,259,487 are believed to be the closest prior art to the vibration damping device of the present invention. The damping devices of both of these patents use an ER fluid which is contained within rigid housings to provide for increased pressures and quicker response time not believed obtainable with ER dampers using an elastomeric sleeve or bellows for the chamber-forming member.

However, the structures of both of these prior art damping devices require a complicated structure consisting of numerous parts in order to achieve the electrical isolation required for applying a voltage to the restricted orifices or ducts through which the ER fluid moves, and requires the passage of the wires applying the voltage to the electrode to pass through the ER fluid chamber. Likewise, the outer body or housing must be of a rigid metal, since this outer housing is connected at one end directly to one of the spaced vehicle components, and therefore must be of sufficient strength to support the various loads and forces applied thereto. An outer end of the piston rod is connected to the other of the spaced vehicle components for mounting the vibration damping device on the vehicle.

All of the known prior art dampers which use an ER fluid use a single continuous electrode which communicates with the ER fluid. It has been found that by providing a plurality of electrodes spaced within the damper that a greater damping force can be produced with the same equivalent electrode length than that with a continuous electrode with approximately the same electrical current and voltage.

Thus, the need exists for an improved vibration damping device, using ER fluids, which is of a simpler construction, which is able to withstand the various loads and forces exerted thereon when mounted between spaced structural components of a vehicle, and which enables a voltage to be applied to a plurality of spaced electrodes contained within the damping device in an easier manner than existing ER fluid dampers.

SUMMARY OF THE INVENTION

Objectives of the invention include providing an improved damping device using ER fluids, which solves the aforementioned problems of prior art dampers by reducing the complexity of the damper without sacrificing the damping characteristics achieved thereby.

A still further objective of the invention is to provide such a damping device which, when used with an electrorheological or electroviscous fluid, enables the orifice and associated electrode to have various configurations in order to achieve various damping characteristics.

Another objective of the invention is to provide such a damping device which is of a considerably simpler structure than prior dampers using ER fluids, and which is able to withstand the various loads and forces exerted thereon when mounted between spaced components in a vehicle suspension system.

A further objective of the invention is to provide such a damping device in which the electrode for supplying voltage to the ER fluid is mounted outwardly of the ER fluid to eliminate the passing of the electrical wires, which supplies the voltage to the electrode, through the ER fluid, as in prior dampers using ER fluids.

A still further objective of the invention is to provide such a damping device which incorporates a pressurized gas reservoir within the damper to prevent cavitation and the formation of bubbles within the ER fluid, thereby preventing the creation of electrical arcing within the fluid.

Still another objective of the invention is to provide such a damper in which the outer housing can be formed of a dielectric material, with the inner housing which forms the piston chamber being formed of metal, thereby enabling smaller diameter cylinders to be used, and to enable all metal components of the damper except for the electrode, to be grounded, to reduce the risk of electrical shorts or shocks.

A further objective of the invention is to provide such a damper in which the electrode is a plurality of discrete electrode bands spaced along the fluid duct and separated from each other by dielectric bands of material, and in which a single voltage source can apply voltage simultaneously to all of the electrode bands, or in which each electrode band can have its own voltage source applied thereto to provide a greater damping force than that provided by a continuous electrode having the same total electrode length, with approximately the same amount of current used in the continuous length electrode.

Still another objective of the invention is to provide such a damping device which can be easily assembled and disassembled for repair and ease of manufacture without sacrificing the integrity of the device.

Another objective of the invention is to provide such a damping device that provides a greater ER gain and ER effect at lower piston velocities, and in which the current draw is lower at higher piston velocities than with prior ER dampers, which enables using a higher electrical field at higher piston velocities, if needed.

A further objective of the invention is to provide such an improved damping device which is of a rugged, compact, relatively lightweight, simple design, which achieves the stated objectives in a simple and efficient manner.

These objectives and advantages are obtained by the vibration damping device of the present invention, the general nature of which may be stated as including a cylindrical inner housing forming a piston chamber; a piston axially movable within the piston chamber and dividing said chamber into two separate fluid chambers; an outer housing surrounding at least a portion of the inner housing; annular fluid transfer duct means formed between the inner and outer housings and surrounding the piston chamber providing fluid communication between the fluid chambers on opposite sides of said piston, the fluid chambers adapted to be filled with an electrorheological (ER) fluid; a plurality of spaced electrode bands for applying electric fields across portions of the duct means to increase the flow resistance of the ER fluid passing therethrough; a piston rod connected at one end to the piston and extending beyond a first end of the damping device with another end of the piston being adapted to be connected to a first support structure; and connection means mounted on a second end of the damping device for connecting the second end of the device to a second structure spaced from the first structure.

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

A first embodiment of the improved vibration damping device, preferably of the type adapted to be incorporated within a vehicle suspension system, is indicated generally at 1, and is shown in FIGS. 1–4. Device 1 includes an inner housing 2 formed of a rigid metal having a cylindrical body 3 with inner and outer cylindrical surfaces 4 and 5, respectively. One end of cylindrical body 3 is open at 6, with the other end being closed by a wall 7.

Figure 2:
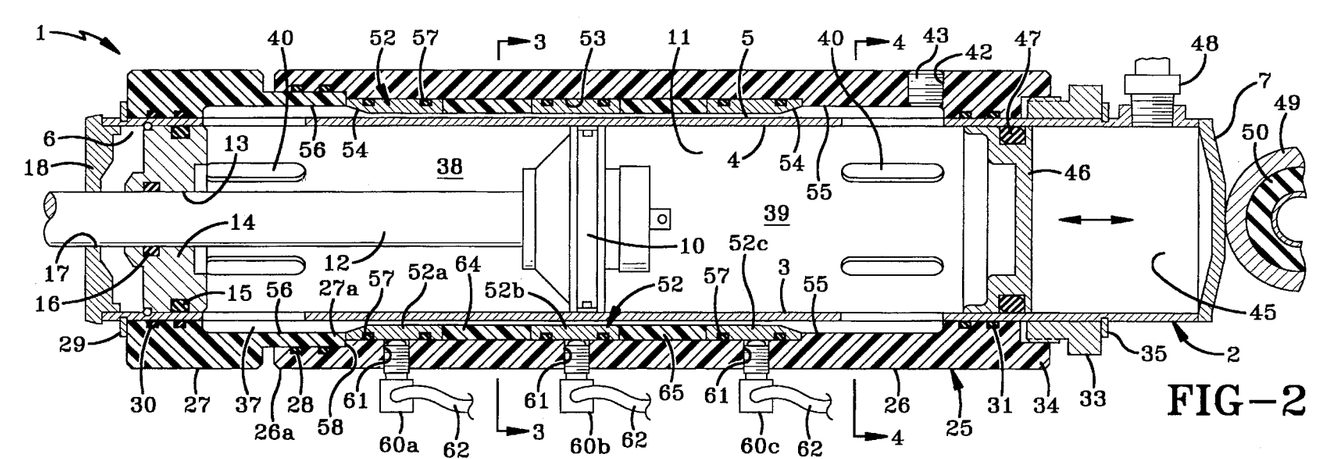
FIG. 2 is an enlarged fragmentary longitudinal sectional view of the damping device of FIG. 1.

The inner cylindrical surface 4 of cylindrical body 3 preferably is coated with a material having good wear characteristics, good impact properties and low friction properties, such as electroless nickel, chromium plating 300 series stainless steels, ceramics, etc.

Figure 1:
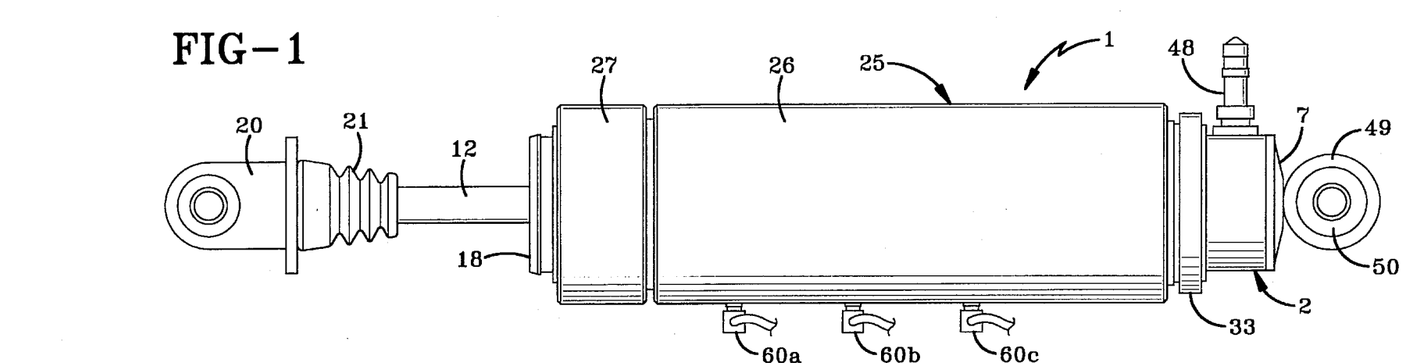
FIG. 1 is a side elevational view of the vibration damping device of the present invention.

A piston 10 is slidably mounted within a piston chamber 11 formed within cylindrical body 3, and has a piston rod 12 attached thereto. Rod 12 extends through a complementary-shaped opening 13 formed in an end closure ring 14. Ring 14 is mounted within open end 6 of cylindrical body 3, and is sealingly engaged therewith by an outer O-ring 15 and an inner O-ring 16. Piston rod 12 also extends through a complementary-shaped opening 17 formed in an end cap 18. As shown in FIG. 1, a connector 20 is mounted on the outer end of piston rod 12 for securing the piston rod to a vehicle component. A usual jounce bumper 21 will be mounted on piston rod 12 adjacent connector 20 for absorbing severe forces exerted on vibration damper 1 to prevent damage thereto upon the vehicle experiencing severe depressions or bumps in a road surface.

Damper 1 further includes an outer housing, indicated generally at 25, which in the embodiment of FIGS. 1–4 is formed of a dielectric material, such as various types of high-strength plastic materials. Housing 25 preferably is formed of two cylindrical portions 26 and 27 which are axially telescopically slidably joined at their inner ends 26a and 27a, and fluidly sealed by a pair of O-rings 28.

The outer end of cylindrical portion 27 is secured in position on inner housing 2 by a clip ring 29, and is sealingly engaged with the outer surface of housing 2 by a spaced pair of O-rings 30. The outer end of cylindrical portion 26 is also sealingly engaged with the outer surface of inner housing 2 by a spaced pair of O-rings 31. Cylindrical portions 26 and 27 of outer housing 25 are slidably mounted and assembled on inner housing 2, and secured in an adjusted position by an adjustment screw ring 33 which is threadably engaged with an internally threaded portion 34 at the outer end of cylindrical housing portion 26. Screw ring 33 is retained in position by a clip ring 35.

As shown in FIG. 2, the outer diameter of inner cylindrical housing 2 is less than the inner diameter of outer housing 25, and in particular, less than the inner diameters of cylindrical portions 26 and 27, in order to provide an annular fluid transfer duct 37 therebetween, which duct extends generally throughout the axial length of outer housing 25.

Piston 10 divides chamber 11 into a pair of fluid chambers 38 and 39, which communicate with transfer duct 37 by a plurality of elongated slots 40 formed in cylindrical body 3 of housing 2. Thus, as shown in FIG. 2, as piston 10 moves within chamber 11, an electrorheological (ER) fluid which is contained within chamber 11 will flow through openings 40 and along transfer duct 37 between the two fluid chambers, depending upon the direction of movement of the piston. A hole 42 is formed in outer housing 25 and communicates with fluid transfer duct 37 in order to fill piston chamber 11 and transfer duct 37 with an ER fluid. A threaded plug 43 will seal hole 42 after filling of damper 1 with an ER fluid.

A pressure chamber 45 is formed in one end of inner housing 2 and is separated from piston chamber 11 by an axially slidably mounted piston or partition wall 46 which is fluidly sealed from chamber 11 by an O-ring 47. Chamber 45 will be filled with a pressurized compressible gas. Upon movement of piston 10 within chamber 11, wall 46 will move into and away from chamber 45 to compensate for the change of volume within chamber 11 caused by the movement of piston rod 12 into and out of the chamber. This movement of wall 46 will maintain a generally constant pressure within the ER fluid to prevent the formation of air bubbles or cavitation, which could cause electrical arcing and shorting when a voltage is applied to the ER fluid, as described below. A valve 48 communicates with pressure chamber 45 for supplying the pressurized gas into the chamber.

A connector 49 is rigidly secured by welds to end closure wall 7 of inner housing 2 for mounting the vibration damper on another portion of a vehicle spaced from that portion of the vehicle to which piston rod connector 20 is attached. An elastomeric bushing 50 preferably is mounted within connector 49 to assist in absorbing small vibrations imparted on the vehicle and damper to assist in achieving the desired damping characteristics.

Figure 3:
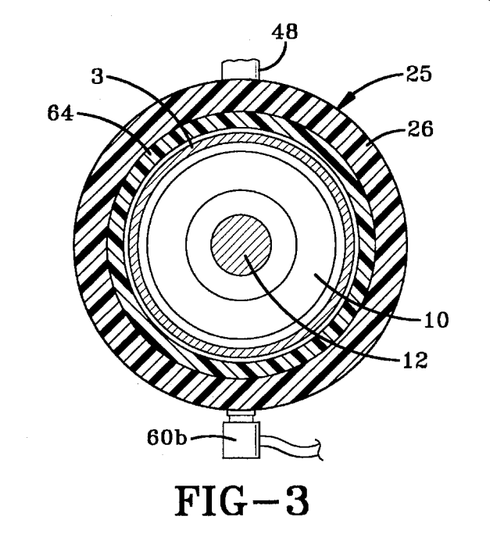
FIG. 3 is a sectional view taken on line 3—3, FIG. 2.
Figure 4:
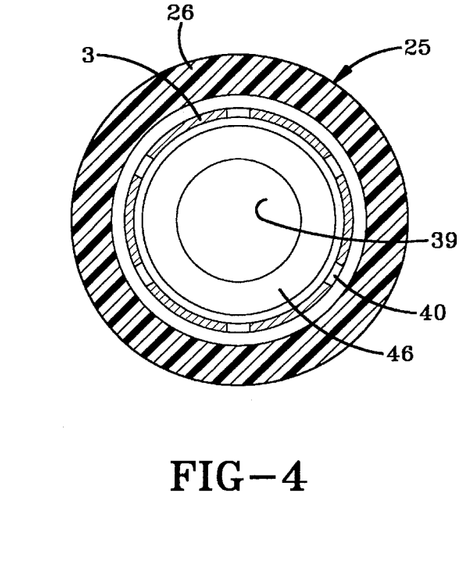
FIG. 4 is a sectional view taken on line 4—4, FIG. 2.

In accordance with one of the main features of the invention, an electrode, indicated generally at 52, is mounted within an annular recess 53 formed within cylindrical portion 26 of outer housing 25. Electrode 52 is formed by a plurality of discrete annular metal electrode bands, indicated at 52a, 52b and 52c, which are seated within recess 53 and separated by two annular bands 64 and 65 of a dielectric material. Electrode bands 52a and 52c preferably have conical outer ends 54 to provide a smooth taper when merging into inner surfaces 55 and 56 of cylindrical portions 26 and 27, respectively, of outer housing 25. Each electrode band is sealingly mounted within recess 53 by a plurality of O-rings 57 and is clamped therein by an inner edge 58 of outer housing cylindrical portion 27 upon the advancement of cylindrical portion 26 toward portion 27 by adjustment screw ring 33 (FIG. 2). A voltage is supplied to each electrode band by an electrical connector 60a, 60b and 60c which extend through complementary-shaped openings 61 formed in outer housing 25, and which are connected to a voltage source by wires 62.

A plurality of bleed holes (not shown) may be formed in piston 10 to permit a limited amount of ER fluid to pass between chambers 38 and 39 as the piston moves in chamber 11. If desired, a one-way check valve may also be used in piston 10 to permit the flow of fluid in only one direction during movement of the piston.

The operation of vibration damper 1 is best illustrated in FIG. 2. Upon the vehicle experiencing a depression or protrusion in the roadway, the piston will chamber into the other chamber via fluid transfer duct 37. Upon passing through the restricted area of duct 37 adjacent electrode bands 52a–52c, which have a voltage applied thereto, the viscosity of the ER fluid will be changed, depending upon the amount of voltage applied to each of the electrode bands and the width of the restricted passage to affect the damping characteristics of the damper, as is well known in the ER fluid damping art.

The same or different voltages may be applied to the individual electrode bands depending upon the desired damping characteristics to be achieved. It has been found that the use of the spaced discrete electrode bands provide increased damping and resistance to the flow of ER fluid through the transfer duct than that achieved by use of a single continuous electrode having the same effective electrode area as that provided by the three discrete electrode bands using the same voltage and current.

The inner housing, which is formed of rigid metal, and piston rod 12, are mounted on the vehicle at spaced locations and support the weight and absorb the various forces exerted on the damper. This enables outer housing 25 to be formed of a dielectric lightweight, preferably plastic material, since it need not absorb any of the forces and loads as do the outer housings or cylinders of prior art ER vibration dampers. Inner metal housing 2 will be connected to ground, with only electrode 52 being electrified, which electrode is completely contained within a dielectric housing. The only external electrical connections are electrical connectors 60a, 60b and 60c and wires 62. Thus, all electrified components are substantially out of possible contact with individuals and/or surrounding components of the vehicle. Likewise, as described above and shown in FIG. 2, very few components are required to form damper 1, which is easily assembled by the slip-fit joinder of the outer housing cylindrical portions over the inner metal housing and their clamping engagement with electrode 52 through the adjustment of screw ring 33.

Figure 5:
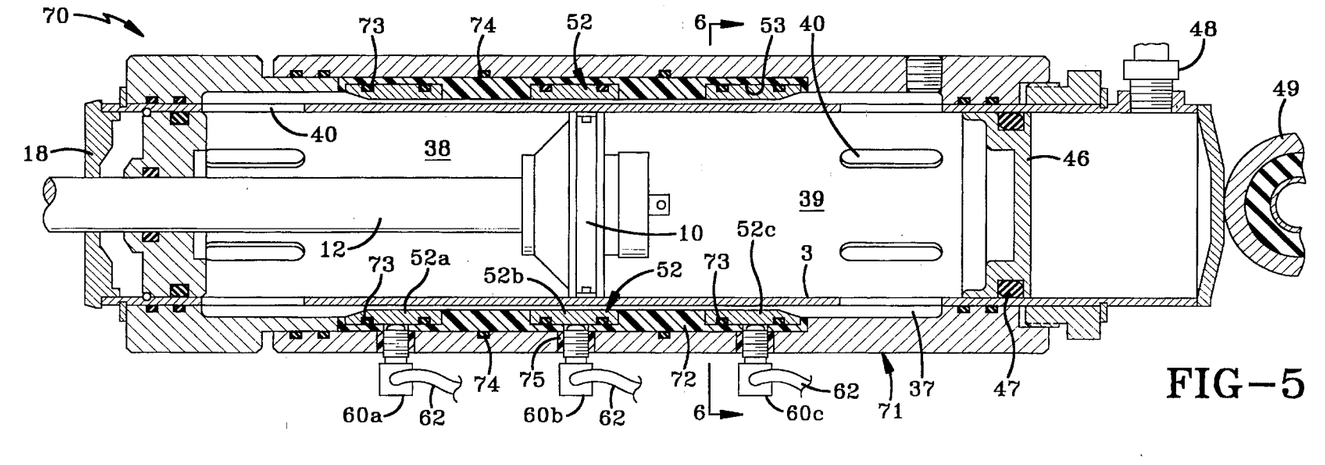
FIG. 5 is a fragmentary longitudinal sectional view similar to FIG. 2 of a second embodiment of the vibration damping device of the present invention.
Figure 6:
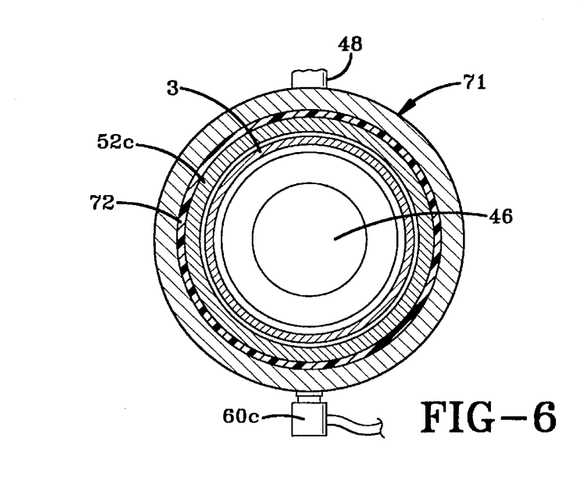
FIG. 6 is a sectional view taken on line 6—6, FIG. 5.

A second embodiment of the vibration damping device of the present invention is indicated generally at 70, and is shown in FIG. 5. Damper 70 is similar in most respects to damper 1 discussed above, except that outer housing 71 is formed of metal in contrast to the dielectric material of outer housing 25 of damper 1. In order to permit outer housing 71 to be formed of metal, an annular insulating sleeve 72 is seated within recess 53 and sealed by a plurality of O-rings 73 and 74 to prevent ER fluid which flows through transfer duct 37 from leaking beyond housing 71. Electrical connectors 60a, 60b and 60c also will be insulated by dielectric insulating sleeves 75 from metal housing 71. The remaining components and manner of operation of damper 70 will be the same as those discussed previously with respect to damper 1.

Figure 7:
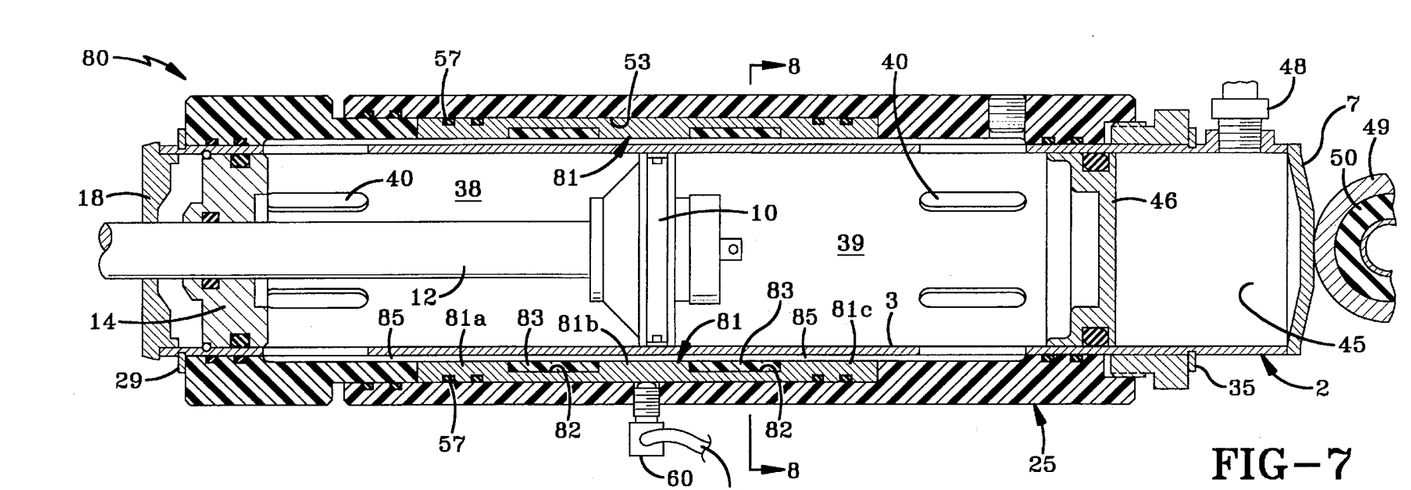
FIG. 7 is a longitudinal sectional view similar to FIGS. 2 and 5 showing a third embodiment of the vibration damping device.

A third embodiment of the present invention is indicated generally at 80, and is shown in FIG. 7. Damper 80 is generally similar to dampers 1 and 70 described above with the exception that the electrode is formed from a continuous cylindrical member 81 which extends completely throughout its length and is seated entirely within recess 53. Electrode 81 does not have the conical ends similar to ends 54 of electrode 52 of damper 1, but provides a continuous uniform width to transfer duct 85 completely throughout the longitudinal length thereof, without any restricted duct area as provided by electrodes 52 of dampers 1 and 70.

Figure 8:
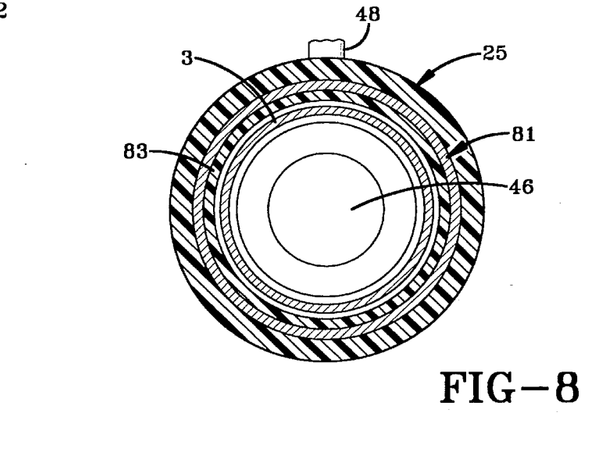
FIG. 8 is a sectional view taken on line 8—8, FIG. 7.

Cylindrical member 81 is formed with a plurality of annular recesses 82, two of which are shown in the drawings, in which is seated an annular band of dielectric insulating material 83 which forms three discrete electrodes 81a, 81b, and 81c spaced along the fluid transfer duct 85. A single electrical connector 60 extends through a hole in outer housing 25 to apply a voltage to electrode 81, which, in turn, is applied to the discrete electrodes 81a, 81b and 81c.

Figure 9:
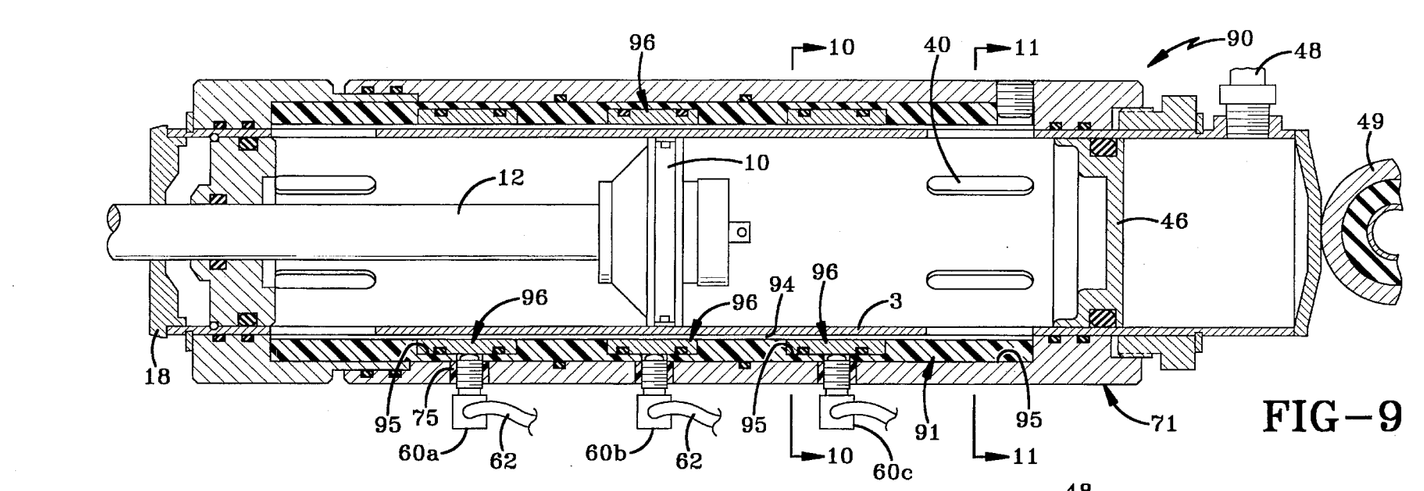
FIG. 9 is a fragmentary longitudinal sectional view similar to FIGS. 2, 5 and 7 of a fourth embodiment of the vibration damping device of the present invention.

A fourth embodiment of the vibration damping device of the present invention is indicated generally at 90, and is shown in FIG. 9. Damper 90 is similar in many respects to damper 70, as shown in FIG. 5 and discussed above, except that insulating sleeve 72 of embodiment 70 is replaced in embodiment 90 with a fluted or splined insulating sleeve 91. Sleeve 91 is formed of a dielectric material and has a plurality of circumferentially spaced longitudinally extending splines 92 (FIGS. 10 and 11) separated by intervening grooves 93. Splines 92 and 93 preferably extend continuously throughout the length of sleeve 91 and the fluid transfer duct 94 formed between sleeve 91 and inner cylindrical body 3.

Figure 10:
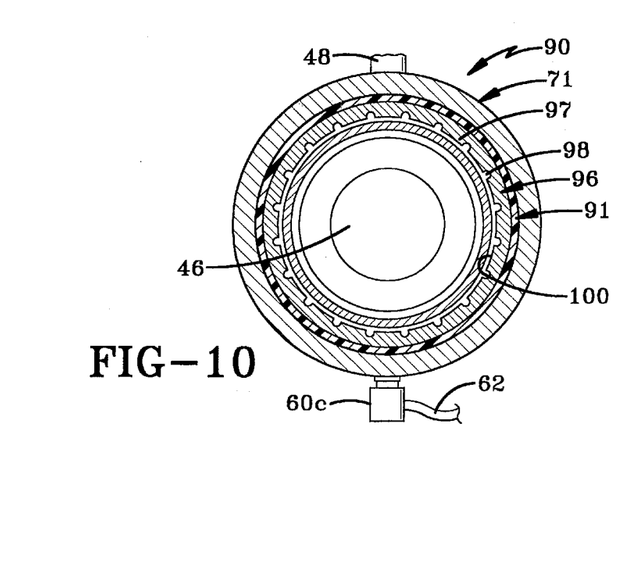
FIG. 10 is a sectional view taken on line 10—10, FIG. 9.
Figure 11:
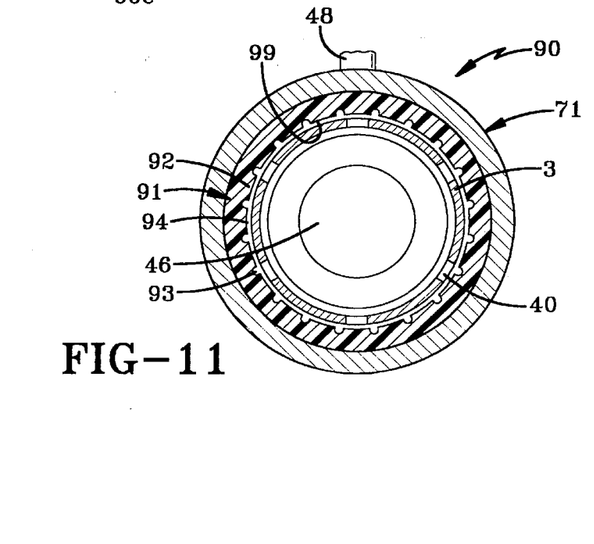
FIG. 11 is a sectional view taken on line 11—11, FIG. 9.

A plurality of annular recesses 95 are formed in cylindrical sleeve 91 and spaced longitudinally therealong for receiving a plurality of electrode bands 96 therein. Each electrode band 96 is also formed with a plurality of circumferentially spaced longitudinally extending splines 97 separated by intervening grooves 98 (FIGS. 10 and 11). Splines 97 of electrodes 96 axially align with splines 92 of insulating sleeve 91, as well as grooves 98 and grooves 93. Thus, the bottoms of grooves 93 and 98 lie on common longitudinal lines as do the inner arcuate surfaces 99 and 100 of splines 92 and 97, respectively. This provides for a continuous flow path of uniform cross sectional area for fluid transfer duct 94 completely throughout the longitudinal length of sleeve 91 without any restricted duct area. Electrical connectors 60a, 60b and 60c are insulated by dielectric sleeves 75 from outer metal housing 71, as discussed previously with respect to damper 70.

The remaining components of damper 90 are similar to those discussed above with respect to damper 70 and, therefore, are not discussed in further detail.

It is also readily understood that the splines and grooves of the electrode bands may align with complementary splines and grooves formed directly in outer housing 25 of damper 1 and 80 and achieve the same results without affecting the concept of the invention.

In summary, the various embodiments provide for a vibration damping device intended for use with an ER fluid, which device is of a relatively simple construction, easy to assemble and mount on a vehicle, and in which the fluid transfer duct can have various configurations. Another advantage of the present invention is that the electrical connection or connections to the electrode or electrodes need not pass through the ER fluid as in prior ER dampers, and requires that only the electrode band or bands be connected to a single or multiple source of voltage. This provides a damper less susceptible to malfunction due to arcing or short circuiting of the applied voltage since the inner housing which is formed of metal, is connected to ground, and the outer housing can be formed of a dielectric insulating material, requiring only passage of the electrical connector through the outer housing to connect the internally located and electrically isolated electrode band to an exterior voltage supply.

Furthermore, the electrode has a plurality of discrete electrode bands spaced along the fluid transfer duct, which produce greater damping force than a continuous electrode in which the electrode length is equal to the total length of the discrete electrodes, with the electrical current in the discrete electrodes being approximately the same as that required in the single continuous electrode.

Test results have shown that the discontinuous or discrete plurality of spaced electrode bands provide a higher ER gain and ER effect at lower piston velocities than that obtained by a single continuous electrode having the same total surface length. Likewise, the current drawn at higher piston velocities is lower, enabling a higher electric field to be utilized at high piston velocities, if needed.

Accordingly, the vibration damping device of the present invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved vibration damping device is constructed and used, the characteristics of the construction, and the advantageous, new and useful results obtained; the new and useful structures, devices, elements, arrangements, parts and combinations, are set forth in the appended claims.

We claim:

1. A vibration damping device using an electrorheological fluid (ER) including:

a metal cylindrical inner housing having an outer diameter and an inner diameter forming a piston chamber;

a piston axially movable within the piston chamber and dividing the piston chamber into two separate fluid chambers;

a cylindrical outer housing formed of a dielectric material having an inner diameter forming an inner cylindrical surface larger than the outer diameter of the cylindrical inner housing and an outer diameter surrounding at least a portion of the cylindrical inner housing, the outer housing including annular recesses in the inner diameter;

annular fluid transfer duct means formed between said inner and outer housings and surrounding said piston chamber providing fluid communication between said fluid chambers on opposite sides of said piston, said fluid chambers filled with an electrorheological (ER) fluid;

a plurality of spaced metal electrode bands, each band being mounted in the annular recesses of the cylindrical outer housing and being in communication with the duct means, for applying electric fields across portions of the duct means to increase the flow resistance of the ER fluid passing therethrough, each electrode band being isolated from the adjacent electrode band by an intervening band of dielectric material;

a piston rod connected at one end to the piston and extending beyond a first end of the damping device with another end of said piston being adapted to be connected to a first support structure;

electrical connector means extending through the outer housing electrically connected to the electrode bands for applying an electrical voltage to the metal electrode bands on the inner diameter of the outer housing; and mechanical connection means mounted on a second end of the damping device for connecting said second end of said device to a second structure spaced from the first structure.

2. The vibration damping device defined in claim 1 in which the mechanical connection means is attached to an end of the inner housing, whereby a load on said damping device is supported by said inner housing and piston rod.

3. The vibration damping device defined in claim 2 in which certain of the electrode bands are cylindrical metal members and have conical ends which merge into the inner cylindrical surface of the outer housing.

4. The vibration damping device defined in claim 1 in which the outer housing includes first and second cylindrical portions; in which the annular recess is formed in at least one of said portions; in which a band of dielectric material is seated in said annular recess between adjacent annular metal electrode bands; and in which the damping device further includes assembly means for joining said first and second cylindrical portions axially together and for securing said annular metal bands and band of dielectric material in said recess.

5. The vibration damping device defined in claim 4 in which the first and second cylindrical portions of the outer housing are axially joined; and in which the assembly means includes a pair of end retention members and an intervening adjustment screw ring.

6. The vibration damping device defined in claim 1 in which the metal electrode bands have annular surfaces which coincide with the inner cylindrical surface of the outer housing to provide a constant spacing between the inner cylindrical surface of the outer housing and the outer cylindrical surface of the inner housing substantially throughout the length of the fluid transfer duct means.

7. The vibration damping device defined in claim 1 in which the metal electrode bands have annular surfaces which extend beyond the inner cylindrical surface of the outer housing and provide a reduced flow area in the fluid transfer duct means.

8. The vibration damping device defined in claim 1 in which a pressurized gas reservoir is formed within the inner housing adjacent the second end of said damping device.

9. The vibration damping device defined in claim 8 including a movable partition means mounted within the inner housing for separating the gas reservoir from the fluid chambers.

10. The vibration damping device defined in claim 1 in which at least one of the electrode bands is formed with a plurality of circumferentially spaced splines and intervening grooves extending longitudinally throughout at least a portion of the fluid transfer duct means.

11. The vibration damping device defined in claim 10 in which the cross-sectional area of the fluid transfer duct means is constant throughout the length of said one electrode band.

12. The vibration damping device defined in claim 11 in which a plurality of circumferentially spaced, longitudinally extending splines and grooves are formed in the inner cylindrical surface of the outer housing and align with the splines and grooves of the said one electrode bands.

13. The vibration damping device defined in claim 12 in which the cross-sectional area of the annular fluid transfer duct means is constant throughout the duct means.

14. A vibration damping device using an electrorheological fluid (ER) including:

a metal cylindrical inner housing having an outer diameter and an inner diameter forming a piston chamber;

a piston axially movable within the piston chamber and dividing the piston chamber into two separate fluid chambers;

a cylindrical outer housing having an outer portion formed of metal, the outer portion having an inner cylindrical surface and an outer cylindrical surface, and an inner portion formed of a dielectric material having an outer cylindrical surface which contacts the inner cylindrical surface of the outer portion, and an inner diameter forming an inner cylindrical surface, the inner diameter of the inner portion being larger than the outer diameter of the cylindrical inner housing, so that the inner portion of the outer housing is between the outer portion of the cylindrical outer housing and the cylindrical inner housing and surrounding at least a portion of the cylindrical inner housing, the inner portion of the cylindrical outer housing including annular recesses in the inner diameter;

annular fluid transfer duct means formed between the cylindrical inner housing and the inner portion of the cylindrical outer housing and surrounding said piston chamber, providing fluid communication between said fluid chambers on opposite sides of said piston, said fluid chambers filled with an electrorheological (ER) fluid;

a plurality of spaced metal electrode bands, each band being mounted in the annular recesses of the inner portion of the cylindrical outer housing and being in communication with the duct means, for applying electric fields across portions of the duct means to increase the flow resistance of the ER fluid passing therethrough, each electrode band being isolated from the adjacent electrode band by the dielectric inner portion of the cylindrical outer housing;

a piston rod connected at one end to the piston and extending beyond a first end of the damping device with another end of said piston being adapted to be connected to a first support structure;

electrical connector means extending through the metal outer portion and the dielectric inner portion of the outer housing and electrically connected to the electrode bands for applying an electrical voltage to the metal electrode bands on the inside diameter of the outer housing; and mechanical connection means mounted on a second end of the damping device for connecting said second end of said device to a second structure spaced from the first structure.

15. The vibration damping device defined in claim 14 in which the mechanical connection means is attached to an end of the inner metal housing, whereby load on said damping device is supported by said inner housing and piston rod.

16. The vibration damping device defined in claim 15 in which the cylindrical metal member has conical ends which merge into an inner cylindrical surface of the inner portion of the outer housing.

17. The vibration damping device defined in claim 14 in which the annular surfaces of the metal electrode bands coincide with the inner cylindrical surface of the inner portion of the outer housing to provide a constant spacing between the inner cylindrical surface of the inner portion of the outer housing and an outer cylindrical surface of the inner housing substantially throughout the length of the fluid transfer duct means.

18. The vibration damping device of claim 14 in which at least one of the metal electrode bands is formed with a plurality of circumferentially spaced splines and intervening grooves throughout at least a portion of the fluid transfer duct means.

19. The vibration damping device defined in claim 18 in which a plurality of circumferentially spaced, longitudinally extending splines and grooves are formed in the inner portion of the inner cylindrical surface of the outer housing and align with the splines and grooves of the electrode bands.

20. The vibration damping device defined in claim 19 in which the cross-sectional area of the annular fluid transfer duct means is constant throughout the duct means.

21. A vibration damping device using an electrorheological fluid (ER) including:

a metal cylindrical inner housing having an outer diameter and an inner diameter forming a piston chamber;

a piston axially movable within the piston chamber and dividing the piston chamber into two separate fluid chambers;

a cylindrical outer housing formed of a dielectric material having an outer diameter and an inner diameter forming an inner cylindrical surface larger than the outer diameter of the cylindrical inner housing and surrounding at least a portion of the cylindrical inner housing, the cylindrical outer housing including at least one annular recess in the inner diameter;

annular fluid transfer duct means formed between said inner and outer housings and surrounding said piston chamber providing fluid communication between said fluid chambers on opposite sides of said piston, said fluid chambers filled with an electrorheological (ER) fluid;

at least one spaced annular metal electrode band for applying electric fields across portions of the duct means to increase the flow resistance of the ER fluid passing therethrough, the electrode band having an inner diameter and an outer diameter forming an outer cylindrical surface, the outer cylindrical surface of the spaced metal electrode contacting the dielectric outer housing at the corresponding annular recess of the cylindrical outer housing and being isolated by the dielectric outer housing, the inner cylindrical surface of the metal electrode band being less than the outer diameter of the cylindrical inner housing electrode band and being in communication with the duct means, the metal electrode band having annular recesses;

annular dielectric bands mounted in the annular recesses of the metal electrode band, each annular dielectric band having an inner diameter greater than the outer diameter of the cylindrical inner housing;

a piston rod connected at one end to the piston and extending beyond a first end of the damping device with another end of said piston being adapted to be connected to a first support structure;

electrical connector means extending through the outer housing electrically connected to the electrode bands for applying an electrical voltage to the metal electrode bands on the inside diameter of the outer housing; and mechanical connection means mounted on a second end of the damping device for connecting said second end of said device to a second structure spaced from the first structure.

22. The vibration damping device defined in claim 21 in which the inner diameter of the metal electrode band coincides with the inner cylindrical surface of the cylindrical outer housing and the inner diameter of the annular dielectric bands to provide a constant spacing with an outer cylindrical surface of the inner housing substantially throughout the length of the fluid transfer duct means.

23. The vibration damping device of claim 21 in which the metal electrode band is formed with a plurality of circumferentially spaced splines and intervening grooves throughout at least a portion of the fluid transfer duct means.

24. The vibration damping device defined in claim 23 in which a plurality of circumferentially spaced, longitudinally extending splines and grooves are formed in the inner cylindrical surface of the outer housing and in the inner diameter of the annular dielectric bands and align each other and with the splines and grooves of the electrode band.

25. The vibration damping device defined in claim 24 in which the cross-sectional area of the annular fluid transfer duct means is constant throughout the duct means.

* * * * *